(12) United States Patent
Bambocci et al.

(10) Patent No.: US 11,468,532 B2
(45) Date of Patent: Oct. 11, 2022

(54) CENTRALIZED OFFENDER MANAGEMENT SYSTEM FOR MULTIPLE JURISDICTIONS

(71) Applicant: **GLOBAL TEL*LINK CORP.**, Reston, VA (US)

(72) Inventors: Anthony Bambocci, Altoona, PA (US); John Lowry, Oak Ridge, NC (US)

(73) Assignee: **Global Tel*Link Corporation**, Reston, VA (US)

( * ) Notice: Subject to any disclaimer, the term of this patent is extended or adjusted under 35 U.S.C. 154(b) by 1099 days.

(21) Appl. No.: 15/452,558

(22) Filed: Mar. 7, 2017

(65) Prior Publication Data

US 2018/0260926 A1 Sep. 13, 2018

(51) Int. Cl.
*G06F 16/9535* (2019.01)
*G06Q 50/26* (2012.01)
*H04L 9/40* (2022.01)

(52) U.S. Cl.
CPC ......... *G06Q 50/26* (2013.01); *G06F 16/9535* (2019.01); *H04L 63/102* (2013.01)

(58) Field of Classification Search
CPC .. G06Q 50/26; G06Q 30/023; G06F 16/9535; G06F 8/60; G06F 8/61; G06F 8/71; G06F 9/44; G06F 21/53; G06F 21/74; G06F 21/71; G06F 21/22; H04L 63/102; H04L 29/06; H04L 9/32; H04M 1/64; H04N 7/14; H04W 12/06
See application file for complete search history.

(56) References Cited

U.S. PATENT DOCUMENTS

| | | |
|---|---|---|
| 6,665,380 B1 | 12/2003 | Cree et al. |
| 2010/0024036 A1 | 1/2010 | Morozov et al. |
| 2011/0047473 A1* | 2/2011 | Hanna ................. H04L 63/0876 715/740 |
| 2013/0091543 A1 | 4/2013 | Wade et al. |
| 2014/0267547 A1 | 9/2014 | Torgersrud et al. |
| 2015/0269596 A1* | 9/2015 | Jain .................... G06Q 30/0203 705/7.32 |
| 2016/0087955 A1 | 3/2016 | Mohamad Abdul et al. |
| 2016/0294881 A1* | 10/2016 | Hua ...................... H04L 63/102 |

* cited by examiner

*Primary Examiner* — Patrick McAtee
*Assistant Examiner* — Nakia Leffall-Allen
(74) *Attorney, Agent, or Firm* — Sterne, Kessler, Goldstein & Fox P.L.L.C.

(57) ABSTRACT

An offender management system (OMS) is a system designed to help process information related to inmates of a correctional facility. Information about an inmate's behavioral history, history in the legal system, and the inmate's financial account are all tracked in an OMS. OMS have been housed on the correctional facility premises, and are proprietary based on the needs of the correctional facility. The current disclosure is directed to an OMS that is housed remotely in data centers and has comprehensive functionality and customizability based on simple guided user interfaces (GUIs). This allows correctional facility administrators to easily customize the OMS to suit the needs of their facilities while removing the overhead required to maintain such systems. The customizability also allows the OMS to serve multiple jurisdictions at once. The centralized OMS contains many novel abilities such as workflow creation, real-time status monitoring of prison processes and accounting processing functions.

9 Claims, 12 Drawing Sheets

FIG. 7

CENTRALIZED OFFENDER MANAGEMENT SYSTEM FOR MULTIPLE JURISDICTIONS

BACKGROUND

Field

The disclosure relates to a system and methods for a centralized offender management system that tracks various status and metrics related to inmates and processes within a correctional facility.

Background

In corrections environments such as prisons, telecommunications are highly monitored and controlled. Typically, a correctional facility makes use of an inmate communication system (ICS), sometimes called an inmate telecommunication system (ITS), that provides both the infrastructure for inmates to communicate with individuals outside of the facility. The ICS also provides correctional facility personnel the ability to record, monitor and control these communications. Several ICS providers exist in today's market that specialize in providing reliable and reliably monitored communications between inmates of a correctional facility and the outside world.

Another major concern of correctional facilities is the tracking and recording of various information related to the inmates occupying the facility. Criminal charges, length of sentence, behavioral history within the facility including behavior when utilizing communications served by the ICS, facility programs and known affiliates, both good and bad, related to an inmate are all examples of information that the administrators of a correctional facility administration typically tracks to ensure the safety and proper treatment of an inmate white staying at the facility. These records are typically entered and stored within an offender management system (OMS), sometimes called a jail management system (JMS), that is housed within or near the correctional facility. An OMS typically serves a single correctional facility, and requires significant manpower to both establish the processes that serve the needs of the facility administrators and maintain the system and those processes.

BRIEF DESCRIPTION OF THE DRAWINGS/FIGURES

The accompanying drawings, which are incorporated herein and form a part of the specification, illustrate embodiments of the present disclosure and together with the description, further serve to explain the principles of the disclosure and to enable a person skilled in the pertinent art to make and use the embodiments.

FIG. 7 illustrates a first screen of the graphical user interface of a centralized OMS, according to an exemplary embodiment of the present disclosure.

Figure 1:
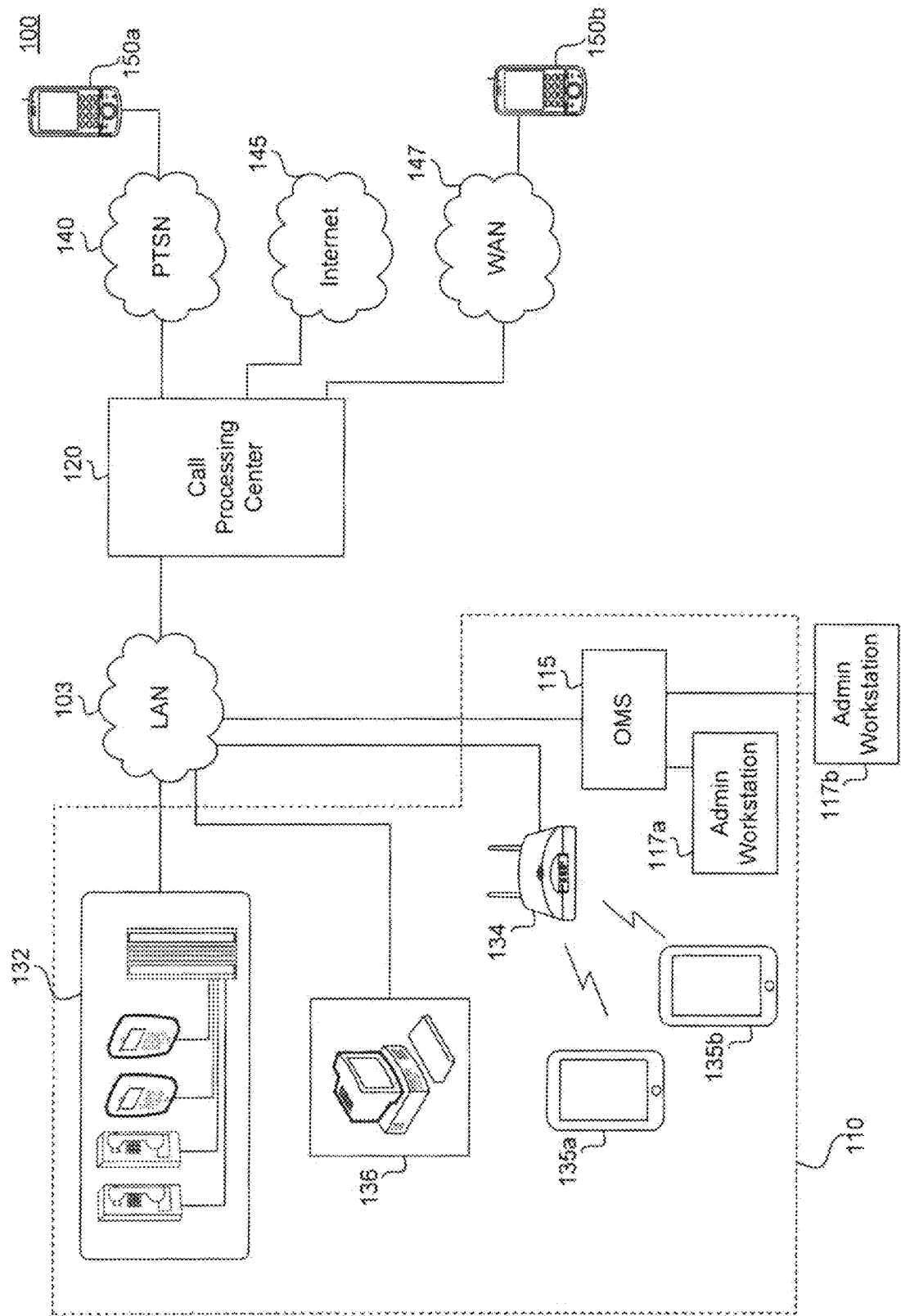
FIG. 1 illustrates a block diagram of a correctional facility, an ICS, and an OMS, according to an embodiment of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Correctional facilities have a strong necessity to track information on about their inmates during their time at the facility. This need has typically been served by an on-site offender management system (OMS), housed within the facility, that allows facility personnel to enter, track, and update information related to inmates as conditions change and events occur within that facility. The OMS is essentially a computer system comprising long-term storage, memory, and processors that run software designed according to facility administrators' specifications for desired processes, graphical user interface layout, information to be stored, and so on. The creation, maintenance, and customization of both the software and hardware of the OMS have typically fallen on the correctional facility itself, where facility officials may hire or otherwise retain engineers, programmers, etc. to maintain these systems. This can be extremely costly to the correctional facilities, which are typically funded by government entities and have stringent budgets, and is also quite cumbersome: requirements must be passed from facility administrators to engineers, where miscommunication is more likely to occur. Furthermore, the very presence of the OMS within the facility invites several risks that may compromise the OMS data integrity—a power outage or other occurrence at the facility may force the OMS offline, or inmates and morally compromised facility personnel may gain illicit access to the OMS. In short, the OMS presence creates a relatively insecure data storage that also serves as a single point of failure for correctional facility processing needs.

FIG. 1 illustrates a block diagram of a typical correctional facility, ICS, and OMS according to an exemplary embodiment. In FIG. 1, a correctional facility 110 offers multiple communication services to inmates within the facility. These services include traditional voice and video communication devices as shown in 132, internet communications on computer terminal 136, and wireless devices 135a and 135b that may serve voice, video, and data communications via a wireless link served by a wireless access point 134. The voice and video communications may run through an integrated access device (IAD), also depicted within block 132, that may convert the communications of inmates within the prison to signals that are compatible with the communications infrastructure outside the prison, such us a local area network (LAN) 103 that may serve packetized communications such as voice over Internet Protocol and other common packet protocols such as TCP/IP and UDP. The wireless access point 134 typically runs some form of the IEEE 802.11 "WiFi" protocol to form wireless links with the wireless devices 135a and 135b. The IAD in block 132, the computer terminal 136, and the wireless access point devices 134 may be connected to the LAN through a wired connection served by IEEE 802.3 "Ethernet" protocol, or may also be served wirelessly. A person with skill in the art will recognize that any number of connection means exist to connect the communication devices serving the inmates and the LAN 103.

Communications coming from devices 132, 136, and 135a-b are routed through LAN 103 to a communication processing center 120, which is maintained and provisioned by an ICS provider. The communication processing center 120 is responsible for connecting, validating, and monitoring communications between inmates within the correctional facility 110 and outside parties or the internet at large. The communication processing center 120 is commonly equipped with various sound monitoring, packet sniffing, and biometric checking functionalities which citable the monitoring of communications to ensure that no prohibited activity is being attempted by the inmates utilizing the communication devices.

While ensuring that an allowed communication is being attempted by the communication devices 132, 135 and 134a-b, the communication processing center is also responsible for routing those communications to outside networks appropriate to those communications. The communication processing center 120 may have a direct connection to public switched telephone network (PSTN) 140, which serves voice communication devices in non-controlled environments such as device 150a. The PSTN may include several voice communication networks, including "plain old telephone service" (POTS) and integrated services digital network (ISDN) lines which are common in public networks all over the world. Communication processing center 120 may also have connection to wide area network (WAN) 147, which may serve packet-based communication devices 150b such as VoIP phones and video communication devices. Finally, the call processing center may be also route communications directly to and from the Internet 145, allowing inmates to perform allowed web browsing online coursework, and the like.

The OSM 115 is depicted as being located within the correctional facility 110. The OMS is implemented and maintained by the correctional facility administration. The OMS may be connected to administrative workstations 117a and 117b, where the administrative workstation 117a may be within the facility, and workstation 117b may be located away from the station. These workstations allow correctional facility personnel to access the OMS and enter new information regarding inmates, events occurring within the facility, and so on. The workstations 117a-b are typically computer terminals which are connected via wireline to the OMS server 115, wherein the wireline connection may be served through common means such as IEEE 802.3 "Ethernet" protocol. Those with skill in the art will recognize that the connection between OMS 115 and terminals 117a-b may have intermediate nodes in a LAN, WAN or other configuration as is common in the art. Furthermore, many administrative workstations may now be offered in mobile devices that are curried by correctional facility personnel—these may connect via a wireless access point 134 to affect changes in the OMS 115.

The present disclosure provides the details of a centralized OMS that provides the functions traditionally served by an OMS while alleviating some of the issues described above. The centralized OMS provides a cloud-network based software platform that allows correctional facility administrators to customize their own graphical user interfaces suited to their needs without the burden of implementing and maintaining the underlying hardware and software of the system. The centralized OMS is located in a hardened data center, where both the software and hardware implementations are maintained by a third party. In embodiments, correctional facility administrators pay fees to the third party that owns the centralized OMS rather than paying to maintain the hardware and software of a local platform, and are provided with login rights to the system. By offering a comprehensive set of functional modules that can be customized by the correctional facility administrator, the centralized OMS is also capable of serving multiple jurisdictions. Once logged into the system, the administrators of a particular correctional facility can customize the graphical user interface (GUI) and choose among the many functional modules provided by the OMS to suit their needs.

Figure 2:
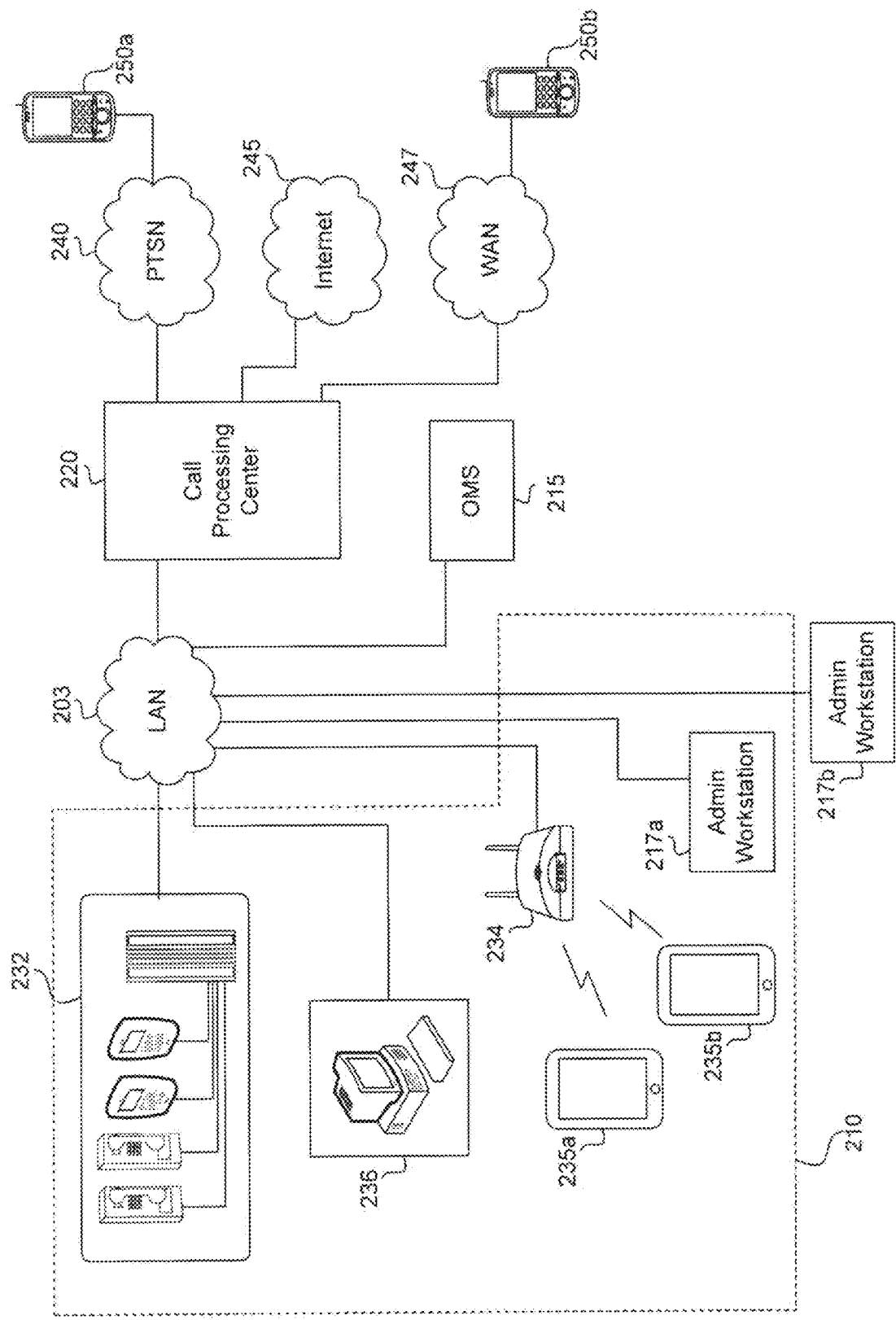
FIG. 2 illustrates a block diagram of a correctional facility, an ICS, and a centralized OMS, according to an exemplary embodiment of the present disclosure.

FIG. 2 illustrates an exemplary embodiment of a system 200 in which a correctional facility is served by a centralized OMS. The correctional facility 210 may be considered an embodiment of correctional facility 110 from FIG. 1. The system of FIG. 2 is largely identical to the embodiment of FIG. 1. Within the correctional facility itself, the same devices are offered to inmates, including voice and video communication devices 232, computer terminal 236, mobile devices 235a-b issued by the correctional facility to inmates, and wireless access point device 234. Administrative workstations 217a-b served either through wireline or wireless connections are also present within facility 210, with workstation 217b representing a remote terminal which may be utilized by the correctional facility. However, unlike the embodiment of FIG. 1, there is no OMS node within the correctional facility similar to OMS 115 from FIG. 1

The system 200 outside of the correctional facility 210 is also largely similar to that of FIG. 1, with a LAN 203 connecting the various devices within facility 210 to the call processing center 220. Call processing center 220 may be an embodiment of call processing center 110 of FIG. 1, and contains at least the same functionalities and components as those described related to embodiment. The call processing center 220 also serves the same main purpose as that of FIG. 1, connecting the inmate communications to outside networks, such as PSTN 240, WAN 247, and Internet 145. Devices 250a and 250b may be devices of either traditional landline (POTS, ISDN, etc.) or VoIP/Video communication types.

The key difference of system 200 is in the location of the OMS system. In FIG. 2, the OMS is centralized in a location outside of the correctional facility. The OMS may still be connected to the administrative workstations 217a-b via LAN 203. In an exemplary embodiment, the OMS 215 is implemented remotely in multiple interconnected individual servers each having their own processing and memory resources, in what is commonly referred to as a "data center." These servers are interconnected and configured in such a way as to provide pooled processing and storage capacity as well as redundancy to prevent a single point of failure for the services being provided. For example, applications being served used by users may be served on several servers simultaneously such that a failure of one server does not cause an application to fail from the user perspective. The servers may be collocated within a single warehouse or location commonly called a "server farm," but even this collocation is not necessary in all cases. All of the functional modules of the OMS are served, and all of the inmate and miscellaneous correctional facility data recorded are stored, within this data center. This arrangement, wherein users access services that are served by a remote server farm architecture, is often referred to as a "cloud computing" environment.

The data center itself is configured in any number of ways depending on the applications being served. This arrangement, including implementing, further provisioning, and maintenance of the data center is provided by a third party rather than the correctional facility, and thus the correctional facility is relieved of this duty. From the perspective of correctional facility administrators, the data center can simply be thought of as a remote server comprising the common components of a server, including memory and one or more processors, serving an application that can be accessed from an administrative workstation 217a-b.

This third party may in fact be the ICS provider themselves, in an arrangement which may have added benefit to the correctional facility because of the extensive record keeping that must be done regarding inmate communications, instead of providing their own implementations of record storage between the various communication apparatuses and the OMS, correctional facilities can rely on the third party to provide an integrated solution of inmate communication record keeping between the call processing center 220 and OMS 215.

Figure 3:
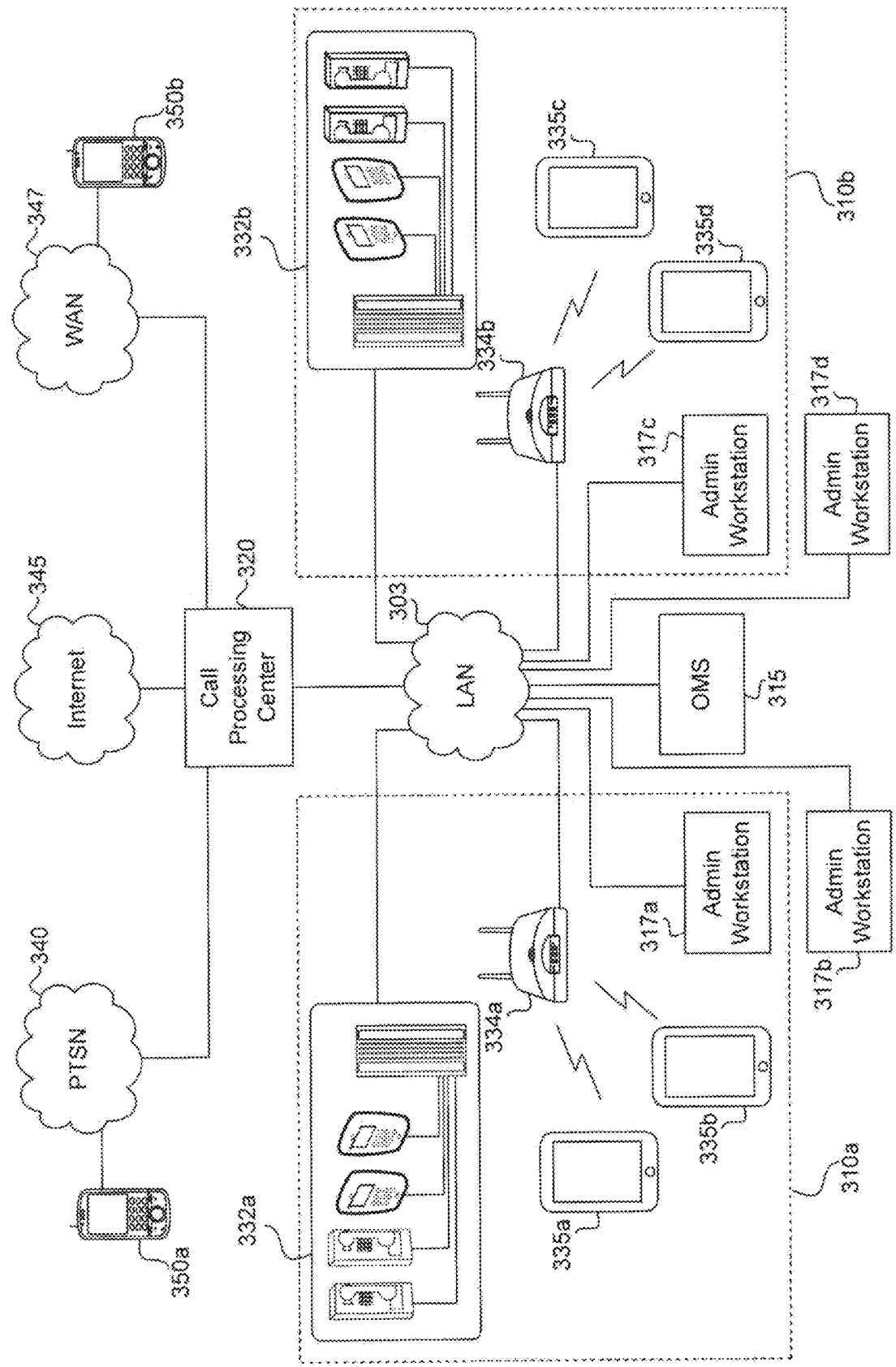
FIG. 3 illustrates another block diagram of a centralized OMS, according to an exemplary embodiment of the present disclosure.

FIG. 3 illustrates an exemplary embodiment of a third system 300 comprising multiple correctional facilities 310a and 310b. These may be considered an embodiment of correctional facility 210 from FIG. 2. These correctional facilities may be affiliated or unaffiliated. Within the correctional facilities themselves, the same devices are offered to inmates, including voice and video communication devices 332a-b, mobile devices 335a-d issued by the correctional facility to inmates, and wireless access point devices 334a-b. Administrative workstations 317a-d are served either through wireline or wireless connections with workstation 317b and 317d representing remote terminals for correctional facilities 310a and 310b respectively.

The system 300 outside of the correctional facilities 310a-b is also largely similar to that of FIG. 2, with a LAN 303 connecting the various devices within facilities 310a-b to the call processing center 320. Call processing center 320 may be an embodiment of call processing center 110 of FIG. 1, and contains at least the same functionalities and components as those described related to embodiment. The call processing center 320 also connects inmate communications from both correctional facilities to outside networks, such as PSTN 340, WAN 347, and Internet 345. Devices 350a and 350b may be devices of either traditional landline (POTS, ISDN, etc.) or VoIP/Video communication types.

Similar to system 200 of FIG. 2, system 300 also contains an OMS 315 that is maintained by a third party and serves the OMS functions of both correctional facility 310a and 310b. OMS 315 may be an embodiment of OMS 215 from FIG. 2. The OMS provides extensive functional modules to both correctional facilities, while the facility administrators from each facility may customize their configurations such that the GUIs and functional modules they require are available to corrective personnel within their facilities. These configurations will be stored within OMS 315. When OMS 315 is accessed by corrective personnel of either facility via their respective administrative workstations 317a-d, their respective configurations will be made available to the personnel. The OMS 315 provides the separation between their configurations such that neither correctional facility is aware of the other while accessing the system.

Figure 4:
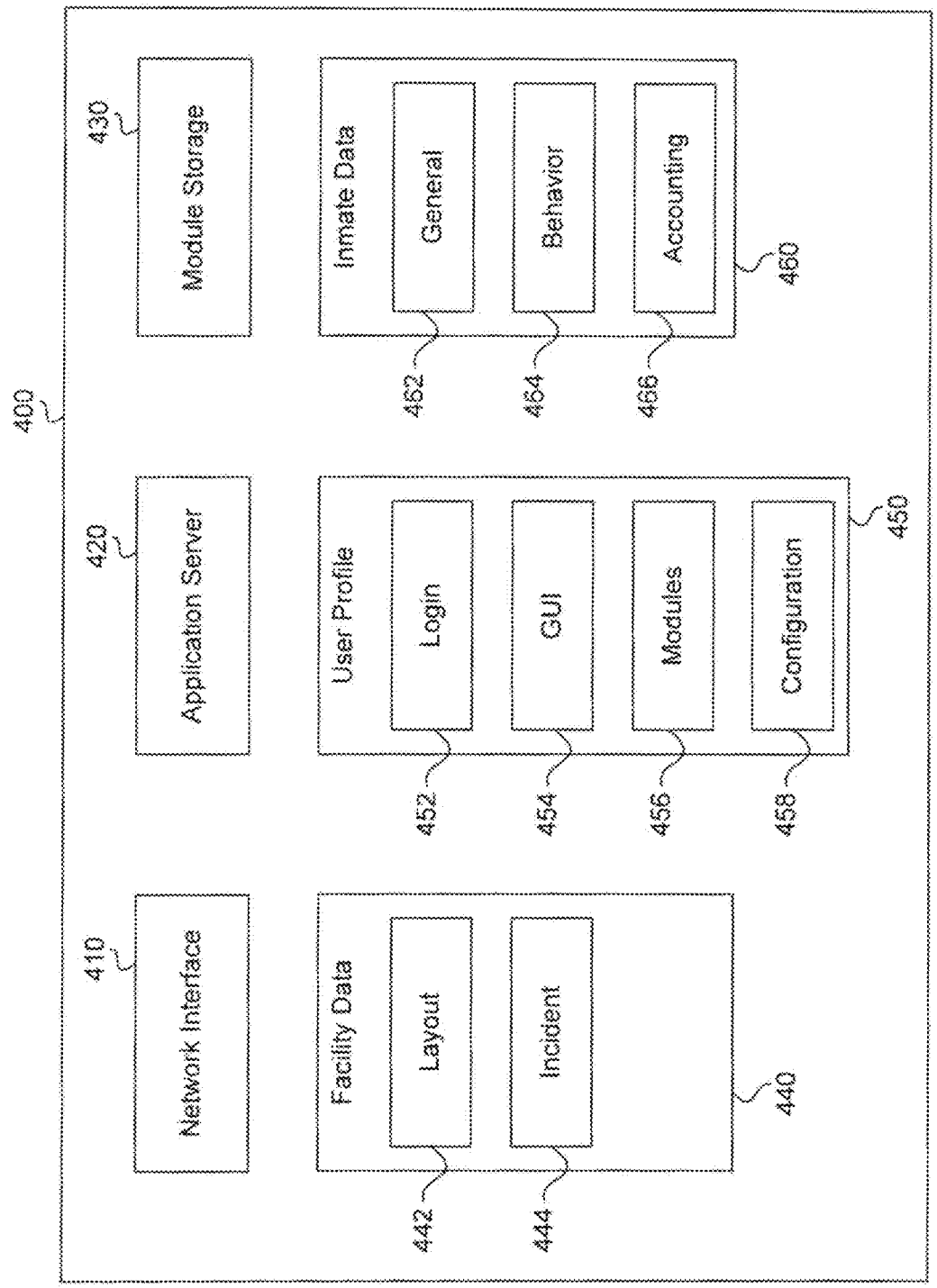
FIG. 4 illustrates the functional elements of an OMS, according to an exemplary embodiment of the present disclosure.

FIG. 4 illustrates an embodiment of the functional components of an OMS 400. OMS 400 may be an embodiment of the centralized OMS 215 and 315 depicted in FIG. 2 and FIG. 3 respectively. As noted above, in an exemplary embodiment an OMS such as OMS 400 is implemented in a data center comprising multiple individual servers, each of which has their own dedicated processing and memory resources. However, since these resources are pooled together to provide enhanced computing capacity and redundancy, FIG. 4 illustrates the functional elements of the OMS 400 and leaves the specific configuration of the data center as an abstract concept. When necessary, specific functionalities of the data center are pointed out in the following embodiments.

In OMS 400, a network interface 410 allows the OMS to connect with various network routing and switching devices, particularly those of a LAN as embodied by LAN 203 and 303 in FIGS. 2 and 3 respectively. All data received or transmitted from the OMS is received from or transmitted to the administrative workstations such as 217a-b, or 317a-d in FIGS. 2 and 3. From the network interface, data can be routed to the various elements of the OMS 400. Application server 420 serves as the main processing center of the OMS, where the OMS applications execute for remote users which have logged into the OMS system. For any user logged into the system, the application server queries all necessary data from module storage database 430, facility database 440, user profile database 450, and inmate database 460.

Module storage database 430 stores all of the program instructions for lite various modules served within the OMS. Based on the user customization, not all modules stored within the module storage are implemented for every user logged into the OMS, and as such, the programmatic instructions that are received from module storage database 430 may be different for each user logged into the system. The module storage database 430 is described in further detail below.

The user profile database 450 stores the configuration settings that define the GUI and modules used by particular users of a particular correctional facility. These settings may include user login database 452, GUI settings database 454, module settings database 456, and configuration settings database 458. In embodiments, correctional facility personnel may be assigned to different, set roles in the prison. There may be personnel whose role is to ensure the security of the facility and the safety of the inmates, while other personnel whose role is to process inmate arrival at the facility, and yet more personnel dedicated to monitoring inmate accounts for potential fraudulent issues. Furthermore, a well-known problem in correctional facilities is the potential for corrupt facility personnel to engage in illicit activity in concert with or in the aide of inmates of the facility. Thus, correctional facility administrators may have reason to restrict access to certain portions of the OMS either preemptively or in response to suspected behavioral issues of facility personnel. User profile database 450 addresses these concerns.

The user login database 452 stores user login data including usernames and corresponding passwords for all correctional facility personnel that may access the system. These username password pairs may also be assigned to different groups, where each group may be given a different set of permissions on how they may operate within the OMS environment. In embodiments, the module settings database 456 contains a list of modules that each user and user group may access when operating in the OMS environment. This list of modules is accompanied by a list of access permissions that describe what level of access each group has to each module—for example, some users may be able to view the data on a GUI screen of the module, but not be able to create any records or modify any fields for that user. In addition, a list of accessible fields within each module for each user and user group is also stored in the module settings database 456 or in the configuration settings database 458. In embodiments, each field within the list of accessible fields also has permissions that define which users and user groups may edit, add, or delete information within each of those fields.

Upon implementation of the OMS, the preferred settings of the correctional facility are stored in this user profile database 450. The application server 420 queries profile module 450 to determine the settings, modules, and GUI apply to that particular user.

Facility database 440 contains data related to the facility that may be used in the OMS. In embodiments, the facility database may store data related to the layout of the correctional facility in layout database 442. The database may also contain incident information database 444 that documents the occurrence of altercations or other illicit activity detected within the facility. This information may contain data such as the time of the incident, a description of the incident, and the correctional personnel and inmates involved. Because the OMS now may serve multiple unaffiliated correctional facilities, this database may contain data from multiple facilities, where the data from a particular facility can only be accessed by a user associated with the particular facility. The process of assigning permissions to users and user groups is described in detail below. All data in this database is retrieved and updated by the application server as dictated by the user logged into the system.

Finally, the OMS contains an inmate database 460 that stores information about inmates of the correctional facility. In an embodiment, inmate database 460 may contain several pieces of information of each inmate for any number of correctional facilities using the centralized OMS 400. For example, there may be general database 462 which contains general information about an inmate's legal status within the facility, such as the reason for their incarceration, sentencing information such as expected release date, number of terms being served, and previous sentencing. The inmate data module also may include behavior information database 464 about the inmate's behavior within the correctional facility, including marks and durations for good behavior, or bad behavioral records such as altercations with other inmates within the prison, violation of policy when using the ICS, or involvement in other incidents within the prison. The module may also contain known associate information for a particular inmate, which may prompt the correctional facility to prevent interaction or close living proximity between parties known to have a criminal connection. Finally, inmate database 460 contains accounting information database 465. In embodiments, inmates are assigned or associated with at least one financial account that allows them to purchase items, pay for communications, and so on within the correctional facility that require tracking. To earn money, inmates may work in work release programs provided by partnerships of the correctional facility and an outside company which allow inmates to earn money for labor. Outside parties, such as family members, may deposit money into the account for them to spend also. A "freeze" or "hold" may be placed on an inmate's account based on certain events, such as suspected fraudulent activity or behavioral issues within the facility. Accounting information database 466 is used to keep track of account balances, transactions, and any potential freezes and holds as described above.

Because the OMS now may serve multiple unaffiliated correctional facilities, this database may contain data from inmates residing in different facilities. The process of assigning permissions to users and user groups is described in detail below. As with the facility database 440, the application server 420 may retrieve and update data contained within the inmate database 460.

It should be noted that all of the databases, and in particular the databases related to user settings and data, are made redundant throughout the data center such that there is no single point of failure. Because a data center essentially comprises multiple interconnected server devices, each with their own individual processing and storage capacity, portions or full copies of data stored in databases 440, 450 and 460 may exist in multiple server devices as well as in multiple centers located in geographically distant areas to prevent OMS failure even in the case of catastrophic events, such as an act of nature, hacking, or terrorism. In the event that a server device or an entire data center goes out of service, login requests to the OMS front the correctional facility may be redirected to another location. Depending on the location of the correctional facility itself its requests may be handled by a different data center. Load balancing between different data centers may also be implemented to prevent the overuse of one location over the other. All of this is abstracted from the correctional facility users thereby lessening their maintenance burden.

Furthermore, the use of virtual machine (VM) technology also allows multiple instances of the OMS to be spawned in any number of server devices (or even across multiple server devices) whenever a new user logs into the OMS. In this way, the processing power needed to actually perform OMS related tasks by the OMS users can also be spread amongst the servers in one or more data centers, allowing for resiliency against failure of any individual server devices. In embodiments, a VM instantiates an "operating screen" that encompasses the current GUI of the OMS and allows interaction with the user of the system. The user interacts with this operating screen, where each interaction is received by the OMS and translated into an interaction with the GUI. VM technology also allows the saving of states, into what is called a "snapshot," such that a user may log off of the OMS without losing their progress in a particular matter, or the layout of their current screen. The state essentially stores a set of programmatic instructions that allows the instantiation of the same operating screen at another device. This allows whatever progress that an user of the OMS has made if they must pause their session or move to a different workstation within the facility for any reason. These states can be accessed from other administrative workstations as well, such that a user's current status within the system can be transferred to different locations if required. This can be a useful tool for correctional personnel who may need to be mobile and therefore need to access the OMS from multiple locations within the facility.

In other embodiments, however, a set of programming instructions that contains the main GUI components and modules may be loaded onto the administrative workstation. The OMS, by way of the application server 420, interacts with the administrative workstation by sending the generic configuration data, module settings data, GUI configuration and permissions data from their respective data storages in the user login database 452. In addition, inmate and facility data is sent to the administrative workstation by the application server, and any allowed changes that are made to any of the inmate data when the user internets with the GUI can be sent from the administrative workstation back to the application server 420. The application server 420 can then update data in the facility and inmate databases 440 and 460 as needed. This may be more appropriate depending on the computing capabilities of the administrative workstations—some machines may not be able to handle the software necessary to use virtual machine environments without significant performance problems, in which this solution may be used.

Figure 5:
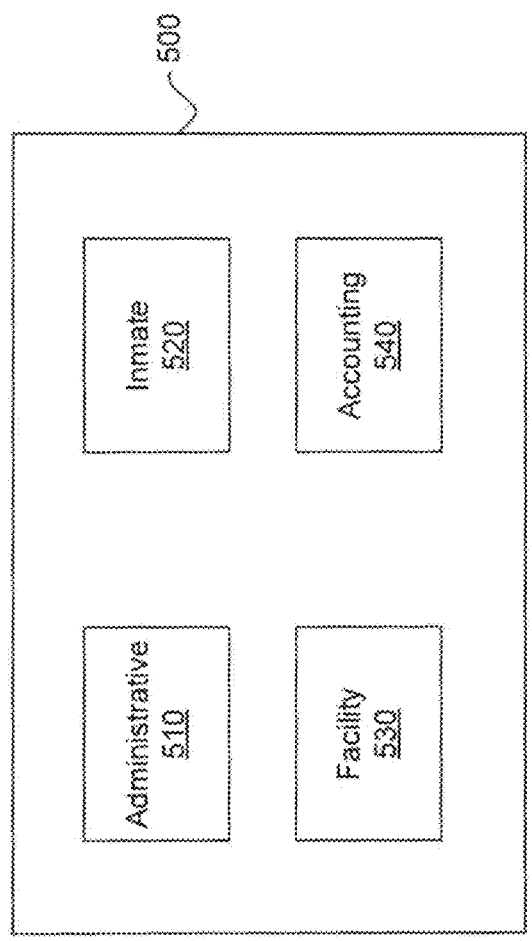
FIG. 5 illustrates the groupings of functional modules of a centralized OMS, according to an exemplary embodiment of the present disclosure.

FIG. 5 illustrates an embodiment of the module groups provided by the OMS. Module storage 500 may be considered an embodiment of module storage 430 as depicted in FIG. 4. FIG. 5 depicts the four groups of modules provided by the OMS. The Administrative module group 510 provides the modules necessary to implement the functions of the OMS desired by the client group. For example, the administrative module group contains modules for creating customized workflows for things like inmate intake, creating customized fields and field values, and so on as desired by the correctional facility—in effect, these modules serve to organize the modules of the other three groups depicted in FIG. 5 to create the desired workspaces for the OMS users. Several of these functions will be described in further detail below.

Inmate module group 520 contains modules pertaining to recording and tracking inmate information and behavior. These modules allow the retrieval and updating of data related to a specific inmate, including legal information such as reason for incarceration, duration of sentence(s), medical and psychological information, enrollment in programs provided by the correctional facility, behavior and illicit events within the facility.

Facility module group 530 contains modules pertaining to recording and tracking of information which affects the entire correctional facility or large groups of inmates within the facility. In embodiments, group 530 contains modules for inputting the layout and housing, arrangement of the prison, incidents involving multiple parties within the prison, visitation logs, and facility inventory. Furthermore, the facility module group contains tools for effectively managing facility processes, and in particular provides a status monitoring module which provides real-time updates and feedback about other OMS processes. In particular, this relates to "workflows" established by the administrative module, and will be described in more detail below.

Finally, the module storage 500 also contains accounting module group 540 that contains the modules related to the tracking of financial information for both the facility and the inmates themselves. In embodiments, inmates may have financial accounts that allow them to purchase items, pay for communications, and so on within the correctional facility that require tracking. Inmates may work in work release programs provided by partnerships of the correctional facility and an outside company which allow inmates to earn money for labor. An OMS is typically tasked with tracking the general bookkeeping of the inmate accounts including sanctioned transactions, monitoring these accounts for suspicious activity or generally poor behavior, and freezing or otherwise restricting the accounts in response to that poor behavior. The accounting module group 540 provides a comprehensive set of modules designed to track this information. Some selected functions are detailed in much deeper detail below.

Figure 6:
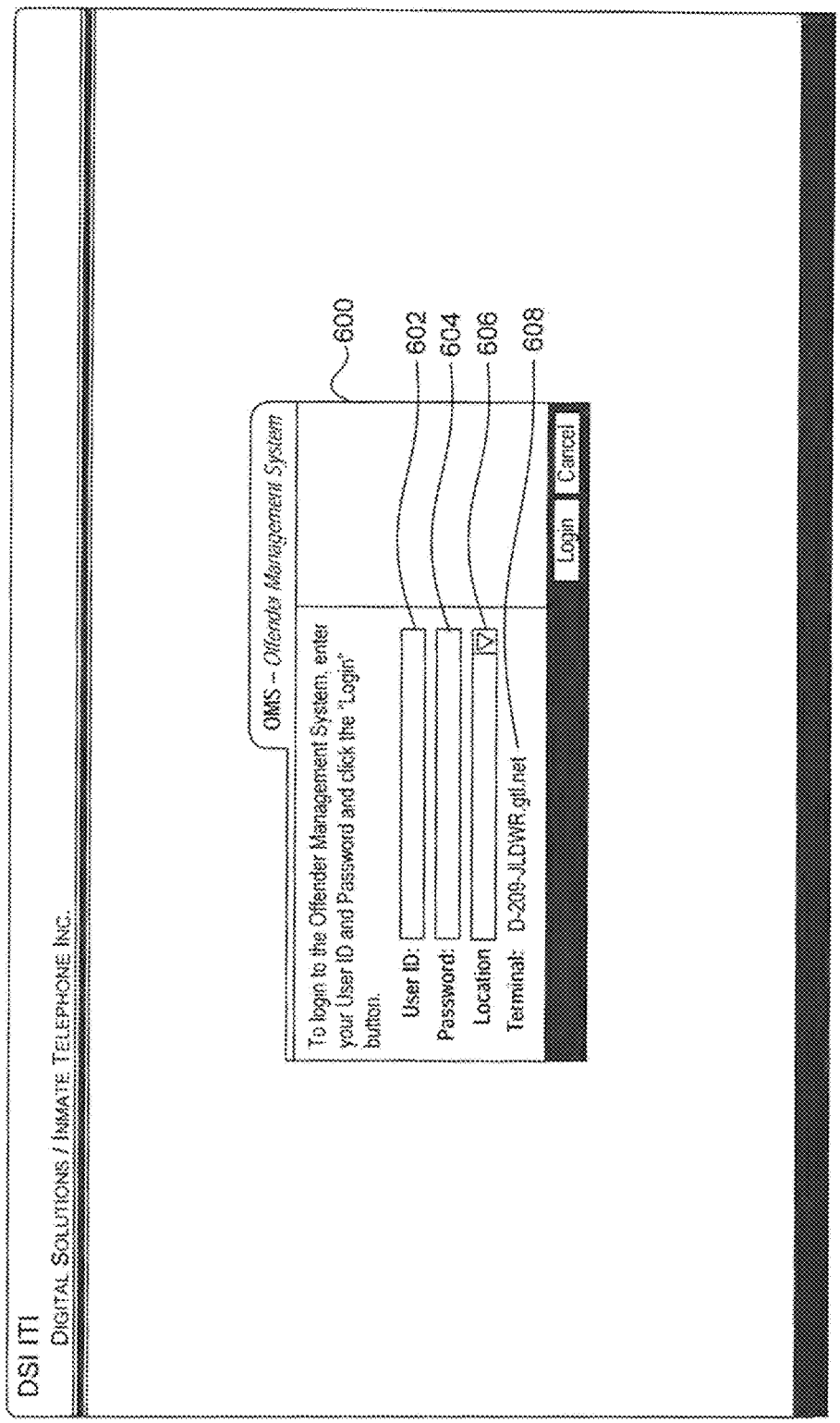
FIG. 6 illustrates a login graphical user interface of a centralized OMS, according to an exemplary embodiment of the present disclosure.

FIG. 6 illustrates a login screen 600 of the centralized OMS. This screen appears when an OMS user first attempts to access the system. In an embodiment, the login screen asks for entry of a "User ID" 602, a password 604, and a location of the correctional facility 606. In some embodiments, the location 606 may be entered by way of a pull down menu with set options, but in other embodiments may also be a typical entry to be entered by the user. At the bottom of the screen is a terminal ID that is associated with the administrative workstation such as 217*a-b* or 317*a-d* from FIGS. 2 and 3 respectively. In an embodiment, the User ID and the location of the correctional facility form a combination which identifies a unique user of the centralized OMS—a User ID may be identical to another so long as the locations are different.

Figure 7:
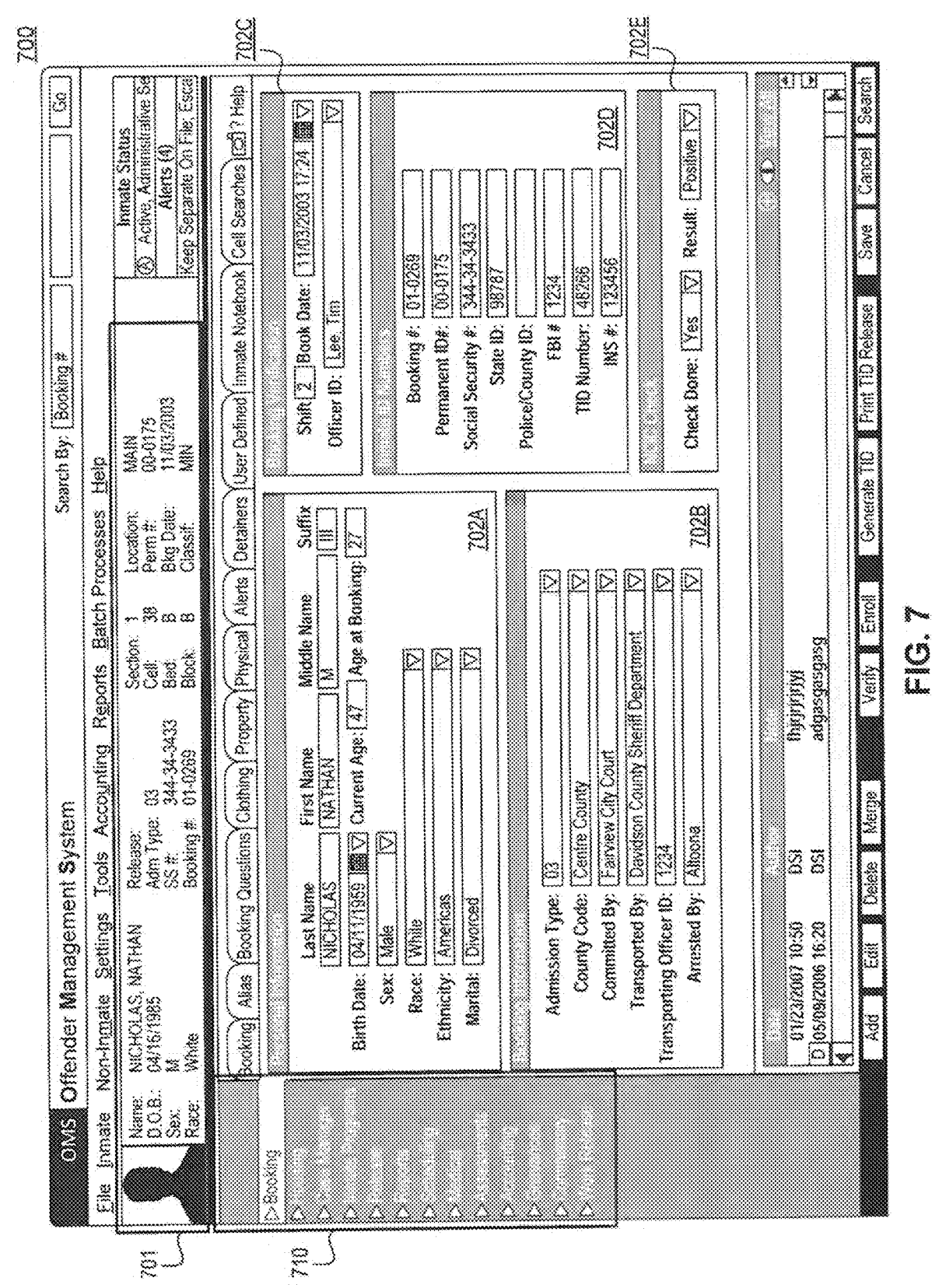

FIG. 7 illustrates a typical screen 700 of the OMS once a user enters a recognized User ID, password, and location information. In embodiments, this screen may be the first screen which appears at the time of login, but can be customized as disclosed. The screen is composed of several sections. In an embodiment, a header section 701 displays general information about a selected inmate. This section may appear blank or not appear at all when an inmate has not been selected by the user. Module side menu 710 shows the available modules that have been deemed necessary by the corrections facility. This module side menu 710 allows a particular module to be selected as by a mouse pointer click or a keyboard key toggle. The modules listed in 710 are all modules that may be available in the module storage, as embodied by module storage 500 of FIG. 5. For example, "Booking", "Medical", and "Scheduling" are all modules that are contained within the inmate module group 520 depicted in FIG. 5, while the "Accounting" module is contained within the accounting module group 540 of FIG. 5. The modules listed in side menu 710 may also contain modules front the other module groups depicted in FIG. 5.

Depending on which module is selected, as indicated by the highlighting on the "booking" module in the side menu 710 of FIG. 7, the content of informational section 702 may change. The informational section 702 may be further dependent on a selection of "pane" as indicated by the lab set 720. Each tab corresponds to a "subscreen" or "submodule" that contains specific information related to the booking module. In this case, the module and pane selected are both titled "Booking." Section 702 contains several subscreens 702A-D that contain various information related to the module and pane selected by the user, in this case the "booking" module and the "booking" pane as indicated in FIG. 7. The choice of informational section is available near the top of the information section in 704, which contains several "panes," also referred to as "subscreens" or "submodules."

It should be noted that all of the sections displayed in screen 700 may be customized by the user upon setup using the administrative modules. The header section 701, module side menu 710, the tab set 720, and the informational section 702 may all be commuted as desired by the user using the administrative module group 510. This allows the correctional facility administrations to determine layouts that are most effective for their needs and their personnel. Furthermore, these layouts may be different for different users within the same correctional facility—the administrative module group 510 may be used establish different modules, GUIs, and permissions for different users or different administrative workstations within a particular correctional facility. Nearly all options of the centralized OMS are customizable to a correctional facility's specifications.

Figure 8:
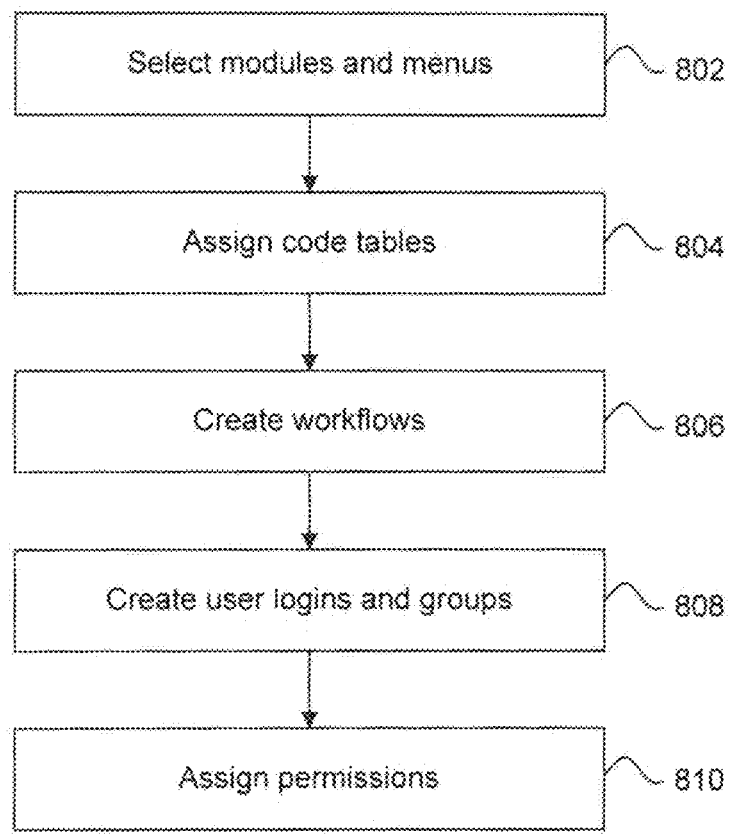
FIG. 8 illustrates a flowchart for the implementation OMS customizations, according to an exemplary embodiment of the present disclosure.

FIG. 8 illustrates a flowchart 800 by which the correctional facility can establish its centralized OMS environment using the administrative modules. This method may be executed upon initial establishment of a correctional facility's contract with the owner of the centralized OMS to provide the processing services offered by the OMS. In an exemplary embodiment, this method is executed by the administrative modules contained in the centralized OMS, such as administrative module group 510 of FIG. 5. FIG. 8 begins in step 802, wherein a user of the OMS chooses which modules it needs from the centralized OMS and the GUI configuration for menu screens associated with those modules. This can be accomplished by use of the "Menu Administration" module provided among the administrative module group 510. In this module, a correctional facility administrator can decide which modules are useful for the facility's needs and determine the menu screen layout, such as screen 700 of FIG. 7.

For each module selected in step 802, an individual GUI can be designed by the correctional facility administration. As seen in FIG. 7, for example, the GUI has a side menu 710, a tab set 720 which has a corresponding informational section 702, also known as a "subscreen" or "submodule," and a header section 701. Note that although the side menu 710 lists several other modules such as "accounting" and "case manager," the screen shown in FIG. 7 is specifically associated with a single module, the booking module. As other modules are selected, the side menu itself may change to allow entry into other screens more closely related to the module currently being displayed. For example, the "accounting" module is related to several other, more specific modules that carry other information related to inmate accounting. Thus, as the user of the OMS enters into the GUI for the accounting module by interacting with the accounting entry on side menu 710, the side menu 710 itself may change when the screen transitions from the current "booking" module to the "accounting" module.

The modules of the administrative module group 510 are presented as fixed GUIs upon initial customization of the OMS by the correctional facility administrator. That is because the modules are not meant to be used by correctional facility personnel on a daily basis—they exist only to allow correctional facility administrators to customize the other OMS modules that are used by correctional facility personnel to process inmate and facility related data. Thus, in step 802, a fixed "Menu Administration" module allows the correctional facility administrators to choose modules from among the module storage 500 that are to be used on a daily basis by the correctional facility personnel. The Menu Administration module also allows the GUIs associated with each of the chosen modules to be customized to keep or remove offered functions in each of those modules depending on the facility's needs, and customize the look and feel of the GUIs that are associated with each of the modules. In embodiments, the selection of modules is stored in the user profile database 450 under the module settings database 456 of the user profile database 440 depicted in FIG. 4. The GUI configurations for each of the chosen modules will be stored in the GUI settings database 454 of the user profile database 440.

In step 804, the correctional facility is asked to assign values to a particular field that may be used in a particular module. In embodiments, each module may have numerous associated codes that exist to keep records related to that module's purpose. For example, an accounting module may track an inmate's financial account, and various user-selectable entries called "codes" within the accounting module may be used to store that information. To name some examples, a code may exist that specifies if that account has been frozen such that the inmate cannot pay for transactions using this account, and another code may exist to specify whether a type of transaction may be engaged by the inmate associated with that inmate account. The centralized OMS allows the correctional facility to specify what values may be stored in each of these aforementioned codes. The specification of these possible code values occurs in step 804.

Figure 9:
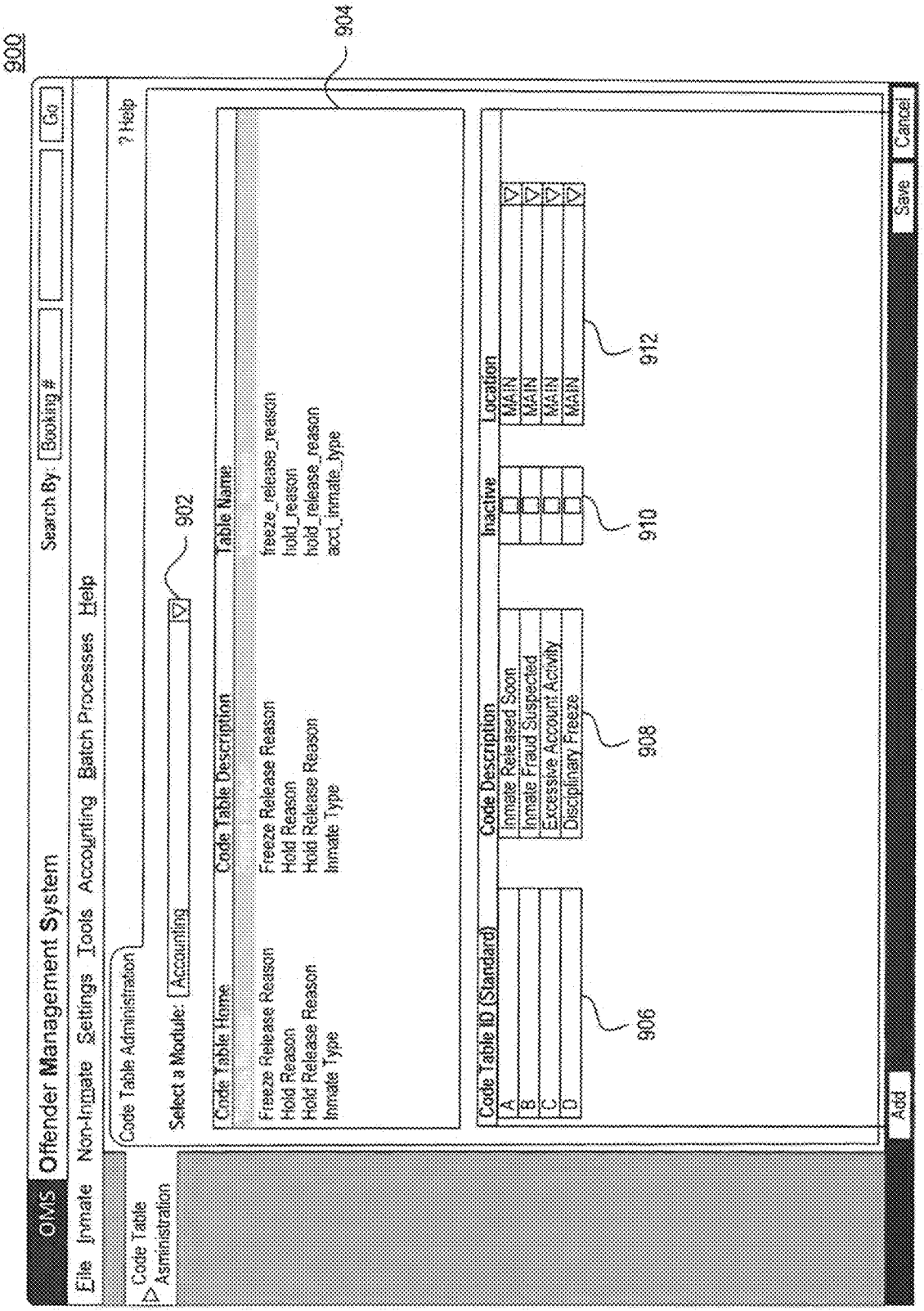
FIG. 9 illustrates a second screen of the graphical user interface of a centralized OMS.

The specification of field values as described above is performed by way of a "code table administration" module contained within the administrative module group 510, which is depicted in FIG. 9. FIG. 9 depicts a screen 900 of the code table administration module. The drop down menu 902 specifies a module, and section 904 specifies a series of entries for different "code tables" that are applied in that module. Each record in section 902 corresponds to a field which will appear in a screen representing the module. Each entry of this essentially refers to a parameter which the correctional facility personnel may change when using the OMS to specify a particular issue with an inmate. These code tables may be stored within the other configurations settings database 458 of user profile database 450.

In the example displayed in FIG. 9, the module selected, as seen in dropdown menu 902, is "Accounting" and the values specified in the code table are "Freeze Reason," "Freeze Release Reason," "Hold Reason," "Hold Reason Release," and "Inmate type". As described above, a field for each of these values will appear within a screen of the accounting module. A correctional facility personnel currently using that screen may wish to enter information into one or more of these fields. Each of these values refers to different actions that might be taken with respect to an inmate's account, and why that action is taken. In this example, the "Freeze Reason" specifies a reason that a "freeze" may be placed on an inmate's account that prevents the inmate from engaging in certain transactions. The freeze on the inmate's account may then be released for some particular reason, the reason also being tracked by the OMS by way of an entry in the accounting module labeled "Freeze Release Reason."

In FIG. 9, the entry "Freeze Reason" is selected in section 904, as indicated by the highlighting of that line in section 904. In section 905, the code table module enumerates the existing reasons that may be selected by the correctional facility personnel in the event that an inmate's account is to be frozen. Table 900 has contains "Code Table IDs" which are single character values associated with a particular reason, and the table 908 contains "Code Descriptions" that specify the reasons associated with the Code table ID characters. As can be seen. Code Table ID "A" is associated with the description "Inmate Released Soon," Code table ID "B" is associated with the description "Inmate Fraud Suspected" and so on. Table 910 indicates whether or not that particular field value is "Inactive" for the prison, in which case the value may not be selected even though it is specified in section 905, and finally table 912 contains a drop down menu for each entry that indicates what a location of the facility in which the Code Table ID may apply. Furthermore, there is an "Add" button 908 that when selected allows the correctional facility administrator to add an additional entry into section 905.

Therefore, during normal operation, when a correctional facility personnel selects the accounting module to input into the OMS new or updated information related to a particular inmate's account, a field entitled "Reason for Freeze" or "Freeze Reason" is available to the correctional facility personnel. The values that may be input by the correctional facility personnel are the reasons specified in section 908 of the code table administration module depicted in FIG. 9.

Returning to FIG. 8, in step 806 workflows are created. A workflow is a chain of modules that are stepped through automatically due to a particular processing action desired by a correctional facility personnel. For example, when a new inmate arrives at the correctional facility, the correctional facility will naturally need to create a record of that inmate in the OMS, including legal and sentencing information, information about known associates, "keep separate" associates that the inmate should not be placed with, medical information, financial account information, and so on. A workflow called "intake" may be created which steps through multiple modules from several of the module groups depicted in FIG. 5 to create a complete record for that inmate within the OMS system. That record may then be stored in the inmate database of the centralized OMS, as depicted by inmate database 460 of FIG. 4. Another workflow may be created called "release" when the inmate is released from the facility, and another called "financial account creation" for creating a financial account associated with the inmate, and so on.

Figure 10:
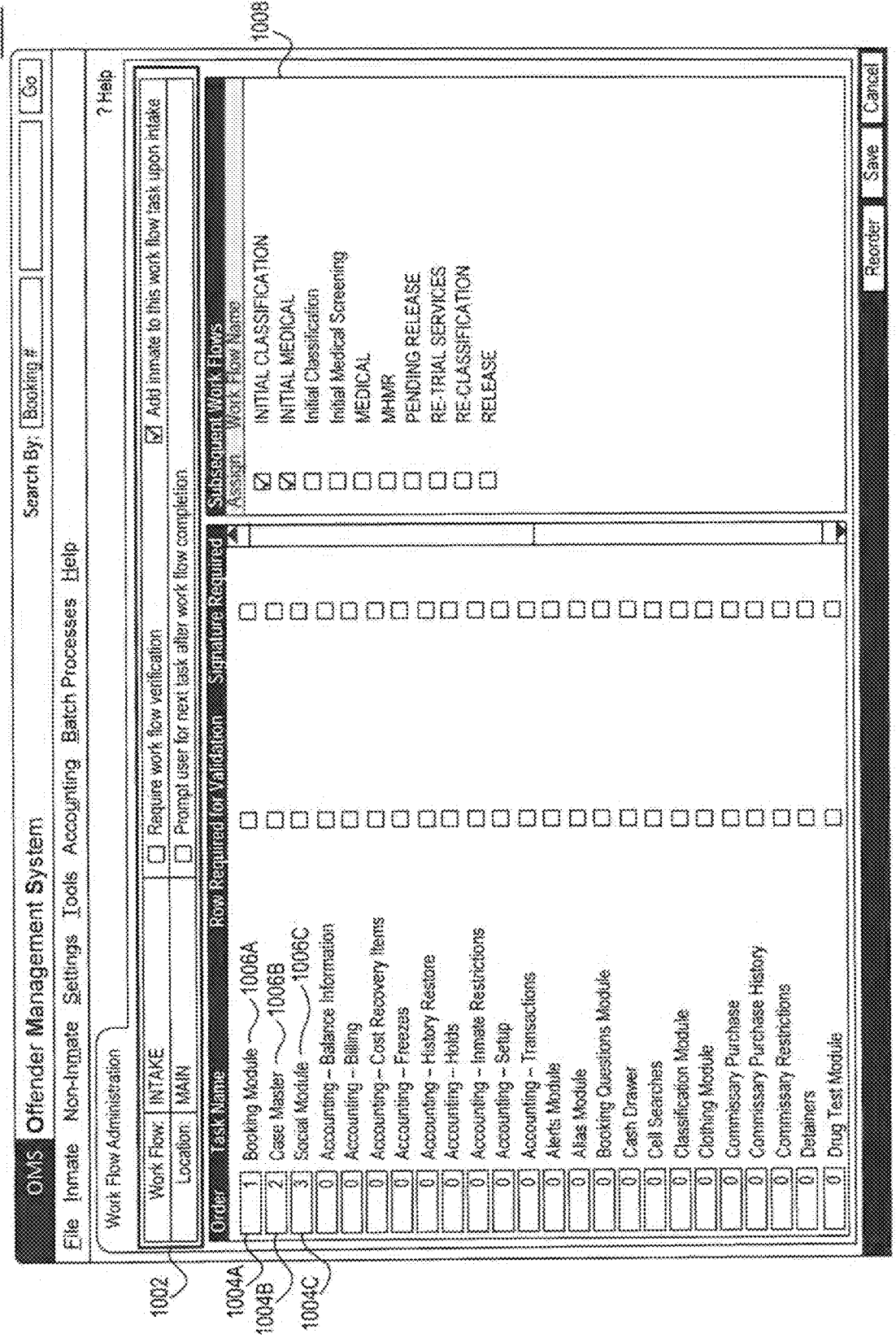
FIG. 10 illustrates a third screen of the graphical user interface of a centralized OMS.

Step 806 as described above is performed by way of a "Workflow Administration" module contained within the administrative module group 510, an embodiment of which is depicted in FIG. 10. In FIG. 10, screen 1000 is the main screen for the Workflow Administration module. In section 1002 the correctional facility administrator specifies a name for the workflow, "INTAKE" in this example. In section 1003, the facility administrator may then specify several modules that are to be initiated when this workflow is initiated by a correctional facility personnel during normal operation of the OMS. In this case, text boxes 1004A-C indicate the numerical order that modules 1006A-C are to be initiated when workflow "INTAKE" is initiated. Therefore, in this example, when a correctional facility personnel initiates the "INTAKE" workflow, the OMS will initiate the "Booking" module and its associated GUI, as indicated by the "1" in the text box 1004A. After that screen is completed to a satisfactory degree, the OMS will then initiate the "Case Master" module, followed by the "Social Module". Section 1008, labeled "Subsequent Workflows," indicates which, if any, workflows are to be initiated immediately after the completion of the workflow being created in the current screen.

Step 806 may also include the use of a "Business Rules Manager" module shut allows the correctional facility administrator to specify business rules and system constraints within the modules. The Business Rules Manager may monitor the fields in a particular screen, such as example screen 900 of FIG. 9, and may execute actions when those specific criteria are met in those fields. The fields and screens monitored, the criteria for those fields, and the actions can all be specified by the administrator. For example, an action may be specified that a record may be added, edited, or deleted when a particular inmate's incarceration status is changed from within the "Booking" module screen 900 of FIG. 9. The OMS may also send an email to a particular set of correctional facility personnel and administrators that such a change has been made to the inmate's incarceration status. Other actions that may occur in general are the addition of an inmate to a workflow, the execution of some internal program or script, the creation of a report, or a popup display occurring on the screen of administrative workstation where the change is being made.

Furthermore, the Business Rules Manager may prevent the entry of malformed information into a particular screen. This allows the correctional facility administrators to prevent the entry of logically or procedurally incorrect information into the OMS. For example, an inmate's date-of-birth may not be the current date, or a date that indicates that the inmate is not of age in a non-juvenile facility. Combinations of fields may also be prevented, such as indicating an inmate's release date without indicating a release personnel.

A "Status Monitor" module also contained within the administrative module group 510 may also be used in step 806. The Status Monitor module allows the correctional facility administrator to create benchmarks or checkpoints within a given screen, process or workflow to signal steps that either have been completed or must be completed. The status monitor may set time limits on particular processes occurring within the OMS, such that the status of these processes moves from "green" indicating a timely status, to "yellow" indication a potential timeliness issue, to "red" indicating that the process is taking well over the amount of time that is expected. In an embodiment, a workflow such as the "INTAKE" workflow described above relative to FIG. 10 may be monitored to determine the time to complete the workflow for each instance of the workflow currently being executed by correctional facility personnel within the OMS. The INTAKE workflow for a particular inmate initially begins at a "green" status indicating that that particular process is not considered untimely. However, if that same INTAKE workflow takes a longer time than is expected, the status may be changed from "green" to "yellow," and if the time taken becomes egregious then this status may be moved to "red."

This same type of status indicator may exist for every INTAKE workflow for each inmate being booked, such that a particularly slow INTAKE process may be identified, triaged, and resolved. For example, a correctional facility personnel may be unaware or unaccustomed to the INTAKE workflow process, and may require retraining if a significant number of the INTAKE workflows being executed by that personnel are found to be attaining a "yellow" or "red" status.

Returning to FIG. 8, in step 808, user logins can be specified. This is done by way of a fixed GUI for a "Security Administration" module. In this module, user logins may be specified, and the user logins may be added to different groups. The different groups may have different access permissions within the OMS. For example, a group for "booking personnel" may exist for users that handle the initial booking of inmates into the facility, and another group called "security" may be for the security personnel that maintain order on the facility grounds. The Security Administration module also allows administrators to edit passwords associated with user accounts associated with the facility or delete accounts outright. In embodiments, step 808 may occur upon initial implementation of the OMS for a particular correctional facility, and be repeated as new personnel arrives or leaves the correctional facility. User logins may also be established as members of different "groups" also stored within the OMS. In an embodiment all of the data gathered in this step may be saved in the user login database 452 of the user profile database 450, as depicted in FIG. 4.

In step 810, permissions are set for the user logins and groups. As discussed above, different facility personnel may be assigned to different roles within the facility, and those roles may not require access to the entirety of the functionality of the OMS. Furthermore, security concerns may require that personnel access to the OMS be restricted to prevent illicit behavior by the personnel themselves. Thus, in embodiments, step 810 includes restricting particular user logins and groups from accessing particular modules (or, in similar fashion, allowing particular user logins and groups access to particular module), or restricting what type of activity they may engage in any particular module, for example, personnel dedicated to facility security may be able to access information of a particular inmate in the booking module, but may not be able to make changes to any of that information. In another embodiment, a list of accessible modules, a list of accessible fields within each module, and the access permissions for each field (read, write, edit) may be created for any user login or group. As with step 808, in an embodiment step 810 is primarily completed using the GUI associated with the Security Administration module, and all of the data gathered in this step may be saved in the user login database 452 of the user profile database 450, as depicted in FIG. 4.

Figure 11:
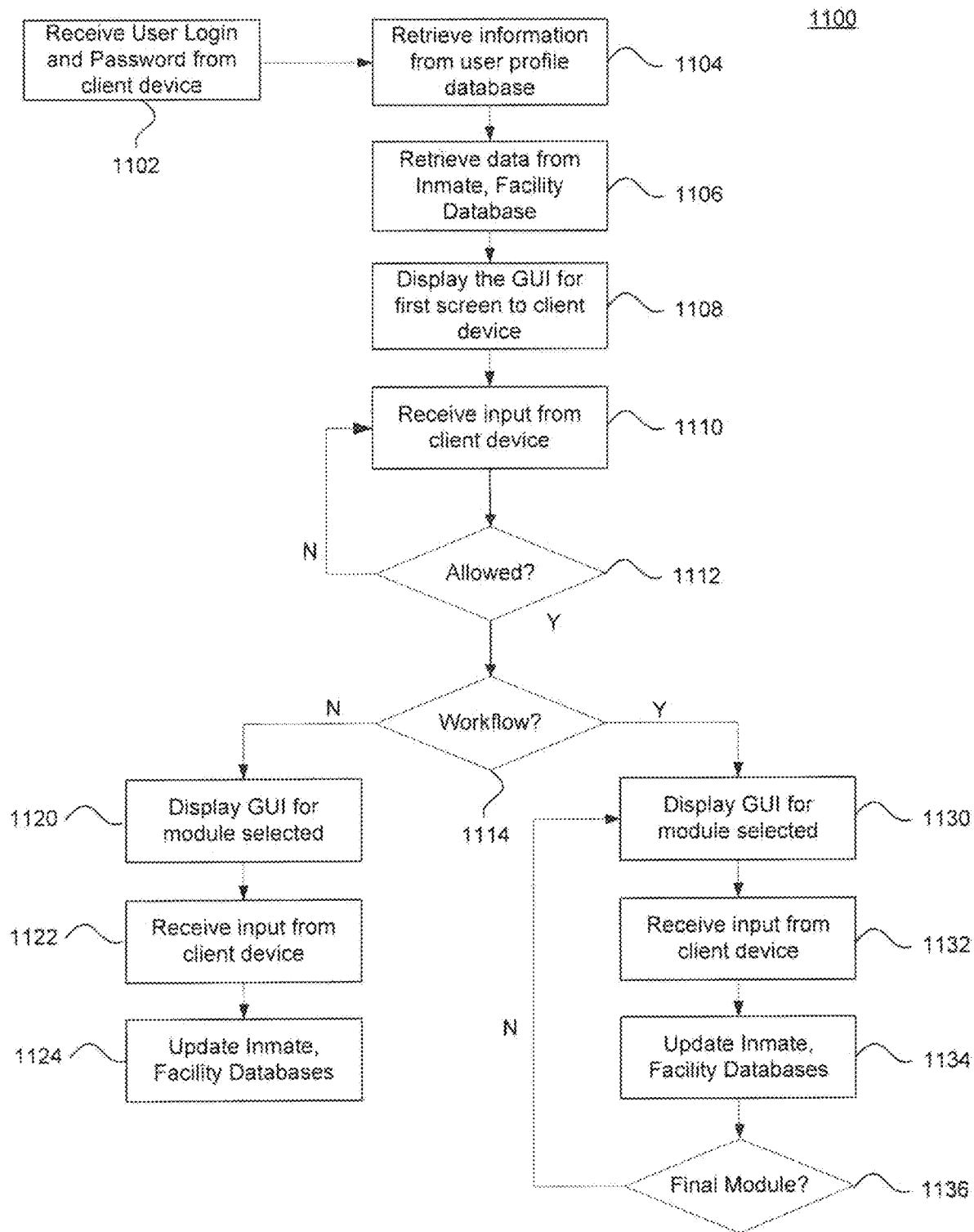
FIG. 11 illustrates a flowchart for operation of the OMS, according to an exemplary embodiment of the present disclosure.

FIG. 11 illustrates a flowchart 1100 that depicts an exemplary embodiment for operations executed by the OMS after a user from a correctional facility logs into the OMS system. The operations are executed within the OMS upon a correctional facility personnel or personnel logging into the system to perform the daily tasks involved in correctional facility administration. Therefore, in this embodiment, the OMS system parameters such as code tables, GUIs, workflows, and so on have already been established to a large extent by correctional facility administrators, and the user of the system in flowchart 1100 is simply a correctional facility personnel, staff, administrator, or otherwise authorized individual that wishes to record information related to an inmate, set of inmates, or the facility itself. The steps of 1100 are described with respect to the OMS 400 depicted in FIG. 4. However, a person with skill in the art will recognize that both the OMS 400 and the flowchart 1100 are not limiting to the system and operations of a centralized OMS, and that many other embodiments that reconfigure the OMS 400 and operational flowchart 1100 would be appropriate in serving the needs of the correctional facility. In step 1102, the user, through a client device such as an administrative workstation such as 217a-b or 317a-d depicted in FIGS. 2 and 3 respectively, logs into the OMS with their designated login and password. To the user, a screen such, as screen 600 depicted in FIG. 6 would appear on the workstation monitor at step 1102 to allow this input.

In an embodiment, this information is received at the OMS at an application server such as application server 420 depicted in FIG. 4. At step 1104, the application server would perform the necessary check to determine a matching user login and password pair by checking against the user login database 452 of user profile database 450 to ensure the correct login. If there was no match, the user would be asked to enter their login and password information again. If the information matched, the user profile database 450 would then send data related to that user back to the application server 420 such that the server could then initiate the proper GUI, module access, and user permissions for the user. This information would come from the other data within user profile database 450, such as GUI settings database 454, modules data 456, and configuration settings database 458. The modules indicated in the modules data 456 may be retrieved from the module storage 430.

At step 1100, the application server 440 within OMS 400 would also retrieve any necessary data from inmate database 460 and facility database 440. In particular, from the inmate database, a small subset of inmate data (down to even just one inmate's data) may be retrieved by the application server 440 to display in a first screen to the user, such as screen 700 of FIG. 7. Facility data may also be retrieved including layout of the correctional facility, inmate living quarters locations, and so on.

Following the retrieval of this data, in step 1108 the application server then executes operations to display a GUI to the user. In an embodiment, the application server creates a session with the client device wherein ongoing communication between the OMS and the client device. As long as the application server is hosting the session, the client device may make any changes to inmate or facility data based restricted by the permissions data retrieved in step 1104. In an embodiment, during the session the user is logged into a virtual machine hosted on the centralized OMS 400 and the GUI will be executed as an operation on the virtual machine locally on the application server. The user is logged into a working environment hosted within the application server, and the application serve contains all necessary software to create the GUI and fill in the fields of the GUI with information from the inmate and facility databases. The client device displays the working environment of the VM on its local monitor either windowed within the monitor screen boundaries or taking up the entirety of the monitor screen, with the OMS GUI either windowed within the working environment or taking up the entirety of the working environment screen. In other embodiments, a client program may be installed on the administrative workstation. When the session starts, data which contains GUI formatting, as well as the inmate and facility data retrieved in step 1106, will be sent to the administrative workstation, which will use the GUI formatting data to initiate a GUI locally in the administrative workstation, and fill in the existing fields with data from the inmate and facility data.

In step 1110, the user may send input to the OMS by way of a key touch on a keyboard, mouse or other well-known means of data input. Any input of commands are received at the application server. If those inputs represent an attempt to enter or edit information into a field of the current screen of the GUI, or access another screen of the GUI representing a different OMS module, then in step 1112, a check will be performed to determine if this input is acceptable from this user. As was discussed above, in embodiments correctional facility personnel may only be granted partial permissions access and edit modules or fields within particular modules dependent on their role within the facility. These permissions are set by correctional facility administrators in the operations depicted in FIG. 8.

If the input represents an action that is not permitted for the user (1112N) the OMS awaits another input from the user without commencing the corresponding operations. In addition, a pop up or some other kind of notification may be issued, as defined by the Business Rules Manager module described above. If the input represents a permitted action (1112Y), the OMS determine in step 1114 if the action is part of a workflow. As described above, a workflow is a predefined progression of modules that may be defined by correctional facility administrators for tasks common to the correctional facility such as the intake of a newly arrived inmate or the release of an existing inmate from the facility.

If the input is determined to not be part of a workflow (1114N), then at step 1120 the GUI for the selected module is presented to the user. This may involve the application server obtaining more information from the facility and inmate databases 440 and 460, as well as obtaining operations for the module from module storage 430 if necessary. At step 1122, further input may be received from the application server 420 from the user of the OMS. This input may be a change in the value of a field of the screen displayed in step 1120, the addition or deletion of a record within that screen, and so on. Typically, changes made will not be considered final until a button is clicked on the screen indicating that the change is final, typically labeled "save", "apply", "next," etc. A person with skill in the art will recognize that there are many such buttons, and that this is a common practice to signify that changes to fields and values are to be made final. In embodiments, step 1122 may cover all of these scenarios. Finally, in step 1124, after changes are confirmed, instructions are sent to the facility and inmate databases 440 and 460 as necessary to change any data necessary in the databases to reflect the desired changes by the user of the OMS. As noted above, the databases may be saved among multiple interconnected server devices, with redundant copies of the database contents in multiple devices and other data centers located in geographically distant areas.

If the input is determined to be part of a workflow (1114Y), such as when a user of the OMS initiates a workflow for a common facility task such as the intake of a new inmate, similar steps are taken as those described above. Steps 1130, 1132, and 1134 mimic those of steps 1120, 1122, and 1124. The key difference in the operations comes in step 1136, where the workflow is checked to see if additional modules need to be completed as defined by the work flow. If so, the steps 1130-1134 are repeated for the next module in the workflow. Therefore, steps 1130-1136 loop continuously while the workflow is incomplete, meaning that there are more modules in the workflow before it is considered complete. Each time this cycle loops, a new GUI representing the module will be displayed (1130), new input will be received from the user (1132), and instructions sent to the inmate and facility databases to update information stored (1134). If, in step 1136, it is determined that the workflow has no more modules defined, then the workflow and the operations of flowchart 1100 are complete. The embodiment is non-limiting, and additional OMS operations may be carried out similar to the operations of 1100 as long as the user is logged into the OMS.

Figure 12:
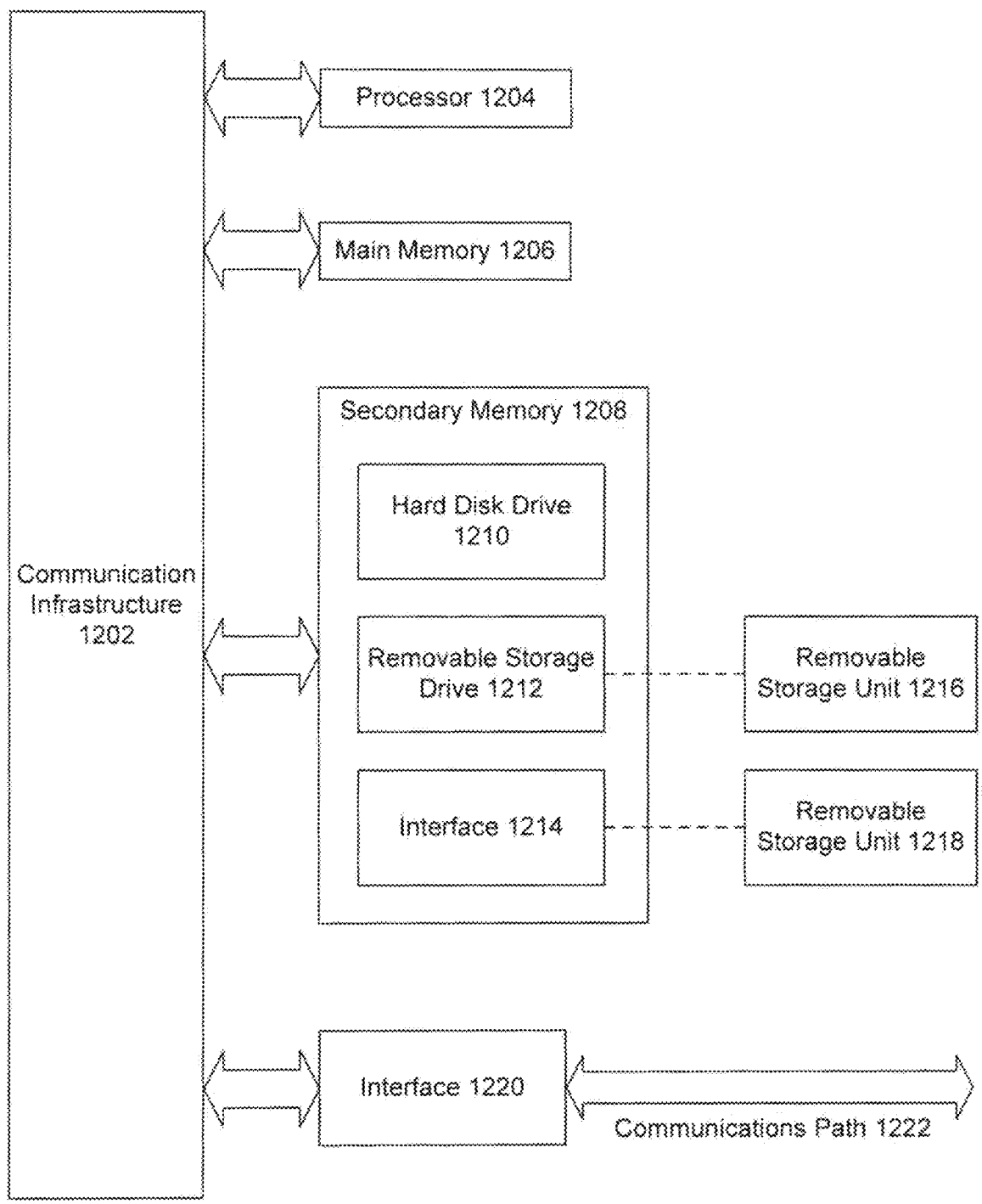
FIG. 12 illustrates a computer system, according to an exemplary embodiment of the present disclosure.

FIG. 12 depicts a computer system 1200 which can be used to implement It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, system 1200 may be an embodiment of a server device that performs some or all of the processing and storage required for OMS 400 of FIG. 4.

An example of such a computer system 1200 is shown in FIG. 12. One or more of the modules depicted in the previous figures can be at least partially implemented on one or more distinct computer systems 1200.

Computer system 1200 includes one or more processors, such as processor 1204. Processor 1204 can be a special purpose or a general purpose digital signal processor. Processor 1204 is connected to a communication infrastructure 1202 (for example, a bus or network). Various software implementations are described in terms of this exemplary computer system. Alter reading this description, it will become apparent to a person skilled in the relevant art(s) how to implement the disclosure using other computer systems and/or computer architectures.

Computer system 1200 also includes a main memory 1206, preferably random access memory (RAM), and may also include a secondary memory 1208. Secondary memory 1208 may include, for example, a hard disk drive 1210 and/or a removable storage drive 1212, representing a floppy disk drive, a magnetic tape drive, an optical disk drive, or the like. Removable storage drive 1212 reads from and/or writes to a removable storage unit 1216 in a well-known manner. Removable storage unit 1216 represents a floppy disk, magnetic tape, optical disk, or the like, which is read by and written to by removable storage drive 1212. As will be appreciated by persons skilled in the relevant art(s), removable storage unit 1216 includes a computer usable storage medium having stored therein computer software and/or data.

In alternative implementations, secondary memory 1208 may include other similar means for allowing computer programs or other instructions to be loaded into computer system 1200. Such means may include, for example, a removable storage unit 1218 and an interface 1214. Examples of such means may include a program cartridge and cartridge interface (such as that found in video game devices), a removable memory chip (such as an EPROM, or PROM) and associated socket, a thumb drive and USB port, and other removable storage units 1218 and interfaces 1214 which allow software and data to be transferred from removable storage unit 1218 to computer system 1200.

Computer system 1200 may also include a communications interface 1220. Communications interface 1220 allows software and data to be transferred between computer system 1200 and external devices. Examples of communications interface 1220 may include a modem, a network interface (such as an Ethernet card), a communications port, a PCMCIA slot and card, etc. Software and data transferred via communications interface 1220 are in the form of signals which may be electronic, electromagnetic, optical, or other signals capable of being received by communications interface 1220. These signals are provided to communications interface 1220 via a communications path 1222. Communications path 1222 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1216 and 1218 or a hard disk installed in hard disk drive 1210. These computer program products are means for providing software to computer system 1200.

Computer programs (also called computer control logic) are stored in main memory 1206 and/or secondary memory 1208. Computer programs may also be received via communications interface 1220. Such computer programs, when executed, enable the computer system 1200 to implement the present disclosure as discussed herein. In particular, the computer programs, when executed, enable processor 1204 to implement the processes of the present disclosure, such as any of the methods described herein. Accordingly, such computer programs represent controllers of the computer system 1200. Where the disclosure is implemented using software, the software may be stored in a computer program product and loaded into computer system 1200 using removable storage drive 1212, interface 1214, or communications interface 1220.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. An offender management system (OMS) that communicates with a client device, that processes inmate data for a plurality of correctional facilities, and that is centrally located, comprising:
    an inmate database that stores the inmate data for the plurality of correctional facilities;
    a module storage database that stores a plurality of software modules, the plurality of software modules including a menu administration module, a security administration module, a code table administration module, and a plurality of inmate processing modules;
    a role database that stores graphical user interface (GUI) configuration data, a selection of software modules from among the plurality of inmate processing modules, a code table configuration that includes a set of possible values associated with a field from among a plurality of fields, and a username assigned to a role from the role database; and
    an application server, configured to:
        receive, from the client device, a first administrative interaction with a menu administration module, the first administrative interaction including the selection of software modules and the GUI configuration data,
        receive, from the client device, a second administrative interaction with a security administration module, the second administrative interaction including the username;
        receive, from the client device, a third administrative interaction that includes the code table configuration;
        receive, from the client device, the role to which the first administrative interaction, the second administrative interaction, and the third administrative interaction apply;
        send, to the role database, the role, the selection of software modules, the GUI configuration data, user login data, and the code table configuration;
        receive the user login data from a user;
        determine, based on the user login data, that the user is assigned to the role; and
        in response to the determining,
            generate a customized user interface according to the selection of software modules, the GUI configuration data, and the code table configuration.

2. The system of claim 1, wherein the second administrative interaction further includes permission data associated with the user login data, the permission data including a list of modules from among the selection of modules and a list of fields from among the plurality of fields, and the application server is further configured to send, to a user profile database, the permission data, and
    the user profile database is further configured to store the permission data.

3. The system of claim 2, wherein the permission data further includes a set of allowed interactions for another field from among the list of fields, the set of allowed interactions including at least reading a content of the another field, editing the content of the another field, or removing the content of the another field.

4. The system of claim 3, wherein the application server is further configured to:
    receive, from the client device, a username attempt and a password attempt;
    confirm that the username attempt matches the username of the user login data and the password attempt matches the password of the user login data;
    receive, from the user profile database, the GUI configuration information and the permission data;
    receive the inmate data from the inmate database; and
    execute instructions for displaying, to the client device, a first GUI screen associated with a first module from among the selection of modules;
    wherein the first GUI screen is based at least on the GUI configuration data and the permission data.

5. The system of claim 4, wherein the executing includes initiating an instance of the first GUI screen on a virtual machine (VM) instance, the VM instance including an operating screen that encompasses the first GUI screen and is displayed by the client device.

6. The system of claim 4, wherein the executing includes sending initiation information, GUI configuration information, module permission information, and the inmate data to the client device.

7. The system of claim 4, wherein the code table configuration includes a second set of possible values associated with a second field, and the application server is further configured to:
    receive, from the client device, an interaction indicating an attempted change to a value of the second field displayed on the first GUI screen;
    receive, from the user profile database, the code table configuration;
    determine that the attempted change to the value of the second field is among the second set of possible values; and in response to the determining:
- execute instructions for displaying the attempted change to the value of the second field on the first GUI screen; and
- send the value of the second field, after it has been changed, to the inmate database or a facility database.

8. The system of claim 7, wherein the application server is further configured to discard the attempted change and initiate a notification to the client device in response to determining that the attempted change to the value of the second field is not among the second set of possible values.

9. The system of claim 1, wherein the user profile database further includes user customization selections, and
- wherein generating the customized user interface is further based on the user customization selections.

\* \* \* \* \*

UNITED STATES PATENT AND TRADEMARK OFFICE
CERTIFICATE OF CORRECTION

PATENT NO. : 11,468,532 B2
APPLICATION NO. : 15/452558
DATED : October 11, 2022
INVENTOR(S) : Bambocci et al.

It is certified that error appears in the above-identified patent and that said Letters Patent is hereby corrected as shown below:

In the Specification

In Column 1, Line 33, delete "programs" and insert -- programs, --, therefor.

In Column 1, Line 37, delete "white" and insert -- while --, therefor.

In Column 2, Line 32, delete "on" after "information".

In Column 3, Line 6, delete "us" and insert -- as --, therefor.

In Column 3, Line 29, delete "citable" and insert -- enable --, therefor.

In Column 4, Line 4, delete "curried" and insert -- carried --, therefor.

In Column 5, Lines 29-30, delete "communications, instead" and insert -- communications. Instead --, therefor.

In Column 6, Line 40, delete "lite" and insert -- the --, therefor.

In Column 7, Line 64, delete "465." and insert -- 466. --, therefor.

In Column 8, Line 28, insert -- data -- after "multiple".

In Column 8, Line 32, delete "front" and insert -- from --, therefor.

In Column 10, Line 43, delete "front" and insert -- from --, therefor.

In Column 12, Lines 35-36, delete "Reason Release,"" and insert -- Release Reason," --, therefor.

In Column 13, Line 56, delete "shut" insert -- that --, therefor.

Signed and Sealed this
Twenty-fourth Day of January, 2023

Katherine Kelly Vidal
*Director of the United States Patent and Trademark Office*

CERTIFICATE OF CORRECTION (continued)
U.S. Pat. No. 11,468,532 B2

In Column 14, Line 67, delete "embodiment" insert -- embodiment, --, therefor.

In Column 15, Line 15, delete "module, for" insert -- module. For --, therefor.

In Column 16, Line 5, delete "1100," insert -- 1106, --, therefor.

In Column 16, Line 28, delete "serve" insert -- server --, therefor.

In Column 16, Line 46, delete "input of" insert -- input or --, therefor.